United States Patent [19]

Ursenbach

[11] 4,286,238
[45] Aug. 25, 1981

[54] HARMONIC FILTERING DEVICE FOR RADIO TRANSMITTER

[75] Inventor: François Ursenbach, Paris, France

[73] Assignee: Thomson-CSF, Paris, France

[21] Appl. No.: 106,016

[22] Filed: Dec. 21, 1979

[30] Foreign Application Priority Data

Dec. 29, 1978 [FR] France .............................. 78 36958

[51] Int. Cl.³ ...................... H01P 1/202; H01P 1/212; H01P 1/22
[52] U.S. Cl. .................................. 333/206; 333/22 F; 333/207; 333/223
[58] Field of Search ............... 333/202, 206, 207, 245, 333/170, 176, 222-226, 22 R, 22 F, 81 A

[56] References Cited

U.S. PATENT DOCUMENTS

| | | | |
|---|---|---|---|
| 1,644,004 | 10/1927 | Zobel | 333/168 |
| 2,515,061 | 7/1950 | Smith | 333/207 |

FOREIGN PATENT DOCUMENTS

609231  9/1948  United Kingdom ...................... 333/202

Primary Examiner—Marvin L. Nussbaum
Attorney, Agent, or Firm—Cushman, Darby & Cushman

[57] ABSTRACT

A harmonic filtering device placed in a high frequency line connecting a radio transmitter to its load with at least one cell in parallel on the line, constituted by an anti-resonant circuit (at the transmission frequency of the transmitter) in series with a resistor, whose value is approximately 1/20th of the characteristic impedance of the line. This cell is made of a coaxial line with four conductors in which inset elements (short-circuit, capacitor, load) form the inductor and the capacitor of the anti-resonant circuit and the resistor. The resistor of this cell has no effect at the transmission frequency of the transmitter and creates insulation between the load and the transmitter for harmonic frequencies.

3 Claims, 5 Drawing Figures

Fig_1
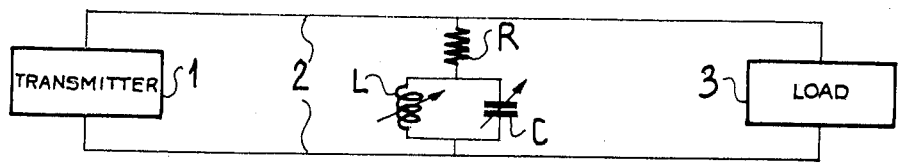
Fig_2
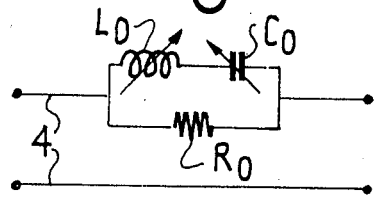
Fig_3
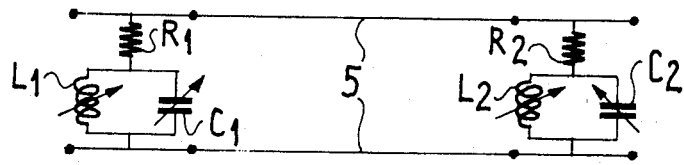
Fig_4
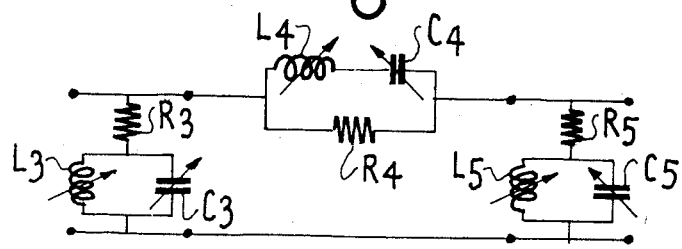

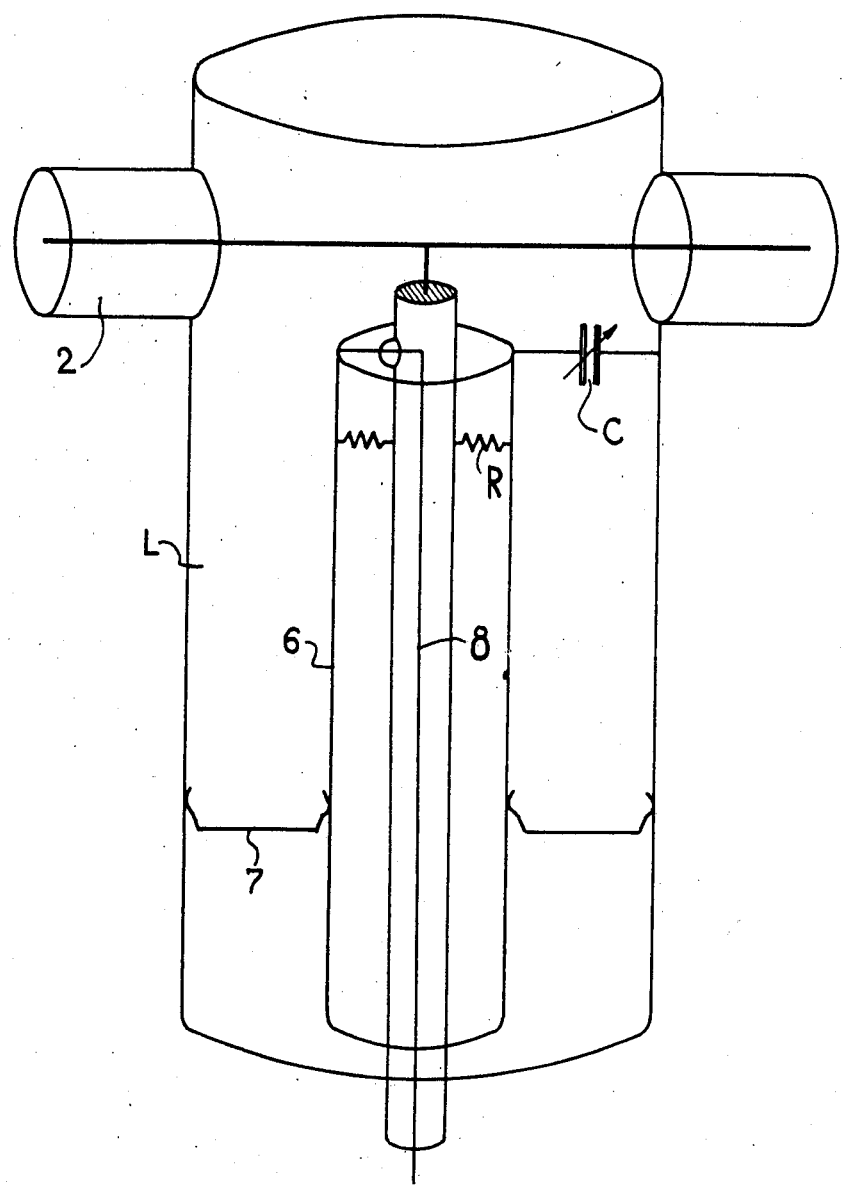

HARMONIC FILTERING DEVICE FOR RADIO TRANSMITTER

BACKGROUND OF THE INVENTION

The present invention relates to harmonic filtering devices intended for use most specifically in transmission stations equipped with high and very high power radio transmitters (over 100 kW and 1,000 kW respectively). High and very high power transmitters are generally equipped with harmonic filtering devices, beyond the anode circuits (or output circuits). The known harmonic filtering devices are reaction circuits with localised or distributed constants, associated with the transmission line between the transmitter and the load. Their function is to eliminate the harmonic signals produced at the same time as the fundamental or useful signal. These harmonic filtering devices can be of very different types, such as low pass, band pass, punctiform rejector, etc. Depending on the type of transmitter and the frequency band to be covered they are fixed or tunable. In all cases they are designed in such a way as to have at their input the rated load with correct matching to the fundamental frequency, if they are closed on the rated load impendance.

In the case of harmonic frequencies, the input impedance, which is to be as close as possible to a short circuit, is highly mismatched. The greater the filtering the greater the extent of mismatching. In this connection it is pointed out that the determination of a filtering device makes it necessary to know the load impedance, which is generally considered as having the same value for the harmonics and for the fundamental frequency in connection with the study of the filtering device. In practice this is far from being the case.

Due to the fact that there are numerous circuits behind the transmitter the load value of the filtering device varies very widely as a function of the harmonic frequency values. Bearing this in mind it is not possible to reliably guarantee a known value of the input impedance of the filtering device for the harmonic signals.

The obvious and well known consequence for designers of transmission stations is the difficulty of providing for the operation of the output stage of the transmitter in the numerous operating configurations offered by switching circuits or other variable circuits positioned downstream of the filtering device. The transmitter is not "insulated" from the load at harmonic frequencies.

BRIEF SUMMARY OF THE INVENTION

The object of the present invention is a harmonic filtering device, called an absorption and insulation filter and which to a very large extent makes it possible to obviate the above-mentioned disadvantages.

This object is achieved by adding to reaction oscillating circuits an adequate resistor which is only traversed by currents relative to harmonics of the second order and higher of the fundamental frequency.

According to the invention, there is provided a harmonic filtering device for a radio transmitter connected to a load by a high frequency line, said device comprising a two line line section for being inserted in said high frequency line and having a first end for being coupled to said transmitter and a second end for being coupled to said load and n filtering cells (n being a positive integer), the cells being arranged in series in said line section when n is greater than 1, wherein at least that one of said cells close to said first end is connected in parallel between the two lines on said line section, comprises a circuit made of a resistor connected in series with an inductance and a capacitance connected in parallel, and includes: a coaxial line with a first and a second end, said coaxial line comprising successively, an outer conductor, a first and a second intermediate conductor and an inner conductor, each of these conductors having a first and a second end respectively forming part of the first and second end of said coaxial line; a short circuit and a capacitor each of which being arranged between said outer conductor and said first intermediate conductor to respectively determine said inductance and said capacitance; an inner load arranged between said first and second intermediate conductors for determining said resistor; and a connection across said second intermediate conductor between the first end of said inner conductor and said first intermediate conductor for determining, with the second end of said inner conductor and the second end of said second intermediate conductor two points for measuring a voltage applied to said resistor.

BRIEF DESCRIPTION OF THE DRAWINGS

The invention will be described in greater detail hereinafter relative to non-limitative embodiments and the attached drawings, wherein show:

FIG. 1 the circuit of an arrangement comprising a filtering device according to the invention.

FIG. 2 the circuit of a cell of a filtering device according to the invention.

FIGS. 3 and 4 circuits of filtering devices according to the invention.

FIG. 5 a more detailed view of the filtering device of FIG. 1.

DETAILED DESCRIPTION OF PREFERRED EMBODIMENTS

FIG. 1 shows a radio transmitter 1, which in the present embodiment is a 500 kW transmitter for operation in the frequency band 3.2 MHz to 26.1 MHz. This transmitter is connected by a high frequency line 2 of characteristic impedance $Z=75$ Ohms to a load 3 comprising an antenna and its matching circuit. A filtering device, called an absorption and insulation filter is connected in parallel to line 2. This filtering device is constituted by a resistor R of value equal to $Z/20$ in series with an oscillating circuit constituted by a variable inductance L and a variable capacitor C. The oscillating circuit L-C constitutes an anti-resonant or rejector circuit matched to the fundamental frequency of the transmitter for which it therefore has a quasi-infinite impedance. It therefore prevents the current at the fundamental frequency from circulating in the resistor R and dissipating energy therein. However, for harmonic frequencies of the fundamental frequency the reactance of the rejector circuit is no longer infinite and currents can circulate in the resistor R and dissipate energy therein. As is generally the case it is desirable for the load of the output circuit of a transmitter to be a low impedance for the harmonic frequencies, whereby the resistance value is chosen small compared with the characteristic impedance Z of the line. It has been shown that a value of approximately $Z/20$ is highly suitable. The impedance value formed by resistor R in series with a rejector circuit determines the filtering effect of this filtering device.

Thus, resistor R introduces an attenuation and creates a mask for the harmonic frequencies of circuits positioned downstream of the filtering device, i.e. provides an insulation between load and transmitter. This explains why the filtering device has been called an absorption and insulation filter.

The presence of resistor R is also interesting from another standpoint. The matching of the rejector circuit to the fundamental frequency can be carried out very easily by seeking at its terminals a minimum or zero voltage for the fundamental frequency. This property is important for effecting a manual or automatic matching of the oscillating circuit.

FIG. 2 shows a filtering cell intended for being connected in series with at least one L.C.R. circuit as shown on FIG. 1 in order to constitute a filtering device in which the cell close to the radio-transmitter will be a L.C.R circuit of the type shown in FIG. 1. The cell according to FIG. 2 comprises a line section 4 having the same characteristics as the line 2 of FIG. 1. In one of the conductors of this line section there is a resistor $R_o$ parallel to an inductance $L_o$ and a capacitor $C_o$ in series. The resonant circuit $L_o$-$C_o$ has been designed in such a way that it behaves as a resonant circuit, i.e. it has a substantially zero impedance for the fundamental frequency and a high impedance for the harmonic frequencies. In addition, resistor R has been taken as equal to 20 times Z (Z=characteristic impedance of line 2 in FIG. 1). The value of resistor $R_o$ is not critical and experience has shown that it is merely necessary to give it a value of about 20 times the characteristic impedance of the line.

FIG. 3 is a diagram of a filtering device having two cells $L_1$-$C_1$-$R_1$, $L_2$-$C_2$-$R_2$ like cell L-C-R of FIG. 1. These two cells $L_1$-$C_1$-$R_1$ and $L_2$-$C_2$-$R_2$ are separated by a line section 5, whose length can be regulated between 6 and 10 meters. The filtering device according to FIG. 3 is intended to replace the filtering device L-C-R in the arrangement of FIG. 1.

A filtering device having cells as in FIGS. 1 and 2 is shown on FIG. 4. The filtering device according to FIG. 4 successively has a cell $L_3$-$C_3$-$R_3$ of the type shown in FIG. 1, a cell $L_4$-$C_4$-$R_4$ of the type shown in FIG. 2 and a cell $L_5$-$C_5$-$R_5$ of the type shown in FIG. 1.

Calculations have shown as experience confirms that the input impedance of a filtering device of the type described hereinbefore relative in FIGS. 1, 3 and 4 is substantially independent of the load of the filtering device for harmonic frequencies. This is important because the transmitter can be completely constructed in a factory without worrying about the load at the harmonic frequencies which is generally arbitrary.

FIG. 5 shows in greater detail the filtering device L-C-R shown in FIG. 1. The variable inductance L is constituted by a high frequency line, short-circuited by a plunger 7 which can move in such a way as to vary the line length and therefore the inductance.

The second oscillating circuit element is formed by a variable capacitor C, connected to the input of the inductance. The inner conductor of the inductance contains a resistor R, as well as a coaxial measuring cable 8 permitting the matching of the oscillating circuit L-C to the working frequency of the transmitter. Resistor R, diagrammatically shown by two resistors, is in the form of a water load with dielectric losses. The internal conductor 6 of inductance L is also cooled by the water of the load. The systems controlling the water circulation are not shown so as not to overload the drawing. They are conventional hyperfrequency systems and whose representation would have in no way aided the understanding of the present invention.

The circuit shown in FIG. 5 makes it possible to ensure the continuous frequency regulation in a band of more than 3 octaves corresponding to the short-wave band of 3.20 to 26.1 MHz.

The invention is not limited to the embodiments described and represented hereinbefore and various modifications can be made thereto without passing beyond the scope of the invention.

What is claimed is:

1. A harmonic filtering device for a radio transmitter connected to a load by a high frequency line, said device comprising a line section having first and second lines and inserted in said high frequency line and having a first end coupled to said transmitter and a second end for being coupled to said load and n filtering cells (n being a positive integer), said cells arranged in series in said line section when n is greater than 1, wherein at least that one of said cells close to said first end is connected in parallel between said lines on said line section, comprises a circuit made of a resistor connected in series with an inductance and a capacitance connected in parallel, and includes: a coaxial line with a first and a second end, said coaxial line comprising successively, an outer conductor, a first and a second intermediate conductor and an inner conductor, each of these conductors having a first and a second end respectively forming part of the first and second end of said coaxial line; a short circuit and a capacitor each of which being arranged between said outer conductor and said first intermediate conductor to respectively determine said inductance and said capacitance; an inner load arranged between said first and second intermediate conductors for determining said resistor; and a connection across said second intermediate conductor between the first end of said inner conductor and said first intermediate conductor for determining, with the second end of said inner conductor and the second end of said second intermediate conductor two points for measuring a voltage applied to said resistor.

2. A harmonic filtering device as claimed in claim 1, wherein n is at least equal to 2 and wherein at least one of said cells is connected in series on one of said lines in said line section and comprises a circuit made of a resistor connected in parallel on an inductance and a capacitance connected in series.

3. A harmonic filtering device as claimed in claim 1, wherein said inner load is a liquid with dielectric losses.

* * * * *